United States Patent [19]

Chau

[11] 4,167,766
[45] Sep. 11, 1979

[54] FLEXIBLE DISK TRANSDUCER LOADING AND UNLOADING SYSTEM

[75] Inventor: Set B. Chau, Los Angeles, Calif.

[73] Assignee: Ex-Cell-O Corporation, Troy, Mich.

[21] Appl. No.: 912,469

[22] Filed: Jun. 5, 1978

[51] Int. Cl.² .......................... G11B 21/20; G11B 5/48
[52] U.S. Cl. .................................. 360/104; 360/107; 360/109; 360/128
[58] Field of Search ....................... 360/104, 105–106, 360/102–103, 75, 78, 130, 133, 99

[56] References Cited

U.S. PATENT DOCUMENTS 3,931,641   1/1976   Watrous .............................. 360/104

FOREIGN PATENT DOCUMENTS 1467218   3/1977   United Kingdom ..................... 360/103

OTHER PUBLICATIONS

IBM/TDB, vol. 18, No. 7, Dec. 1975, pp. 2246–2247, "Read/Write Head Load-Unload Device" by Bailey et al.
IBM/TDB, vol. 16, No. 12, May 1974, pp. 4077–4078, "Retraction Tool for Magnetic Heads" by Bosier et al.

Primary Examiner—John H. Wolff
Attorney, Agent, or Firm—Edward J. DaRin

[57] ABSTRACT

A flexible magnetic disk storage system wherein the magnetic transducers ride on opposite sides of the diskette. The transducers are arranged with one transducer fixed in position relative thereto. The movable transducer is mounted on a carriage in a flexible manner to allow it to assume a parallel relationship with the fixed transducer and the diskette prior to application of the operating pressure thereto so as to substantially reduce the wear and/or destruction of the diskette.

5 Claims, 4 Drawing Figures

FLEXIBLE DISK TRANSDUCER LOADING AND UNLOADING SYSTEM

PRIOR ART AND SUMMARY OF THE INVENTION

Flexible magnetic disk storage systems are presently in use. Flexible magnetic discs, or diskettes, are commonly referred to as "floppy disks." The diskette per se is referred to as the "media." At the present time, there are flexible magnetic storage systems utilizing magnetic transducers that are operative with only one side of the diskette. Other floppy disk systems are operative with a pair of magnetic transducers arranged on opposite sides of the flexible media. In the two-sided flexible disk systems presently available during the normal transducer operations, the two transducers are arranged so that they gently squeeze the flexible media in a manner so that each transducer acts as a transducer media/interface force for the other to insure optimum media contact. The obvious advantage of the two-sided system is that twice as much storage space is available for a given diskette size relative to the single-sided system. A flexible magnetic disk system operates at much lower rotary speeds than rigid magnetic disk systems. Rigid magnetic disk systems may be operated as high enough rotary speeds so that a dynamic air bearing can be created between the transducer and the disk and thereby avoid physical contact between the transducer and the rigid disk during the operation of the system. This type of operation is not possible with flexible disk magnetic systems. Due to the lower operating rotary speeds that prevail in flexible disk systems, in order to achieve proper operation, sufficient contact pressure must be provided between the flexible diskette and the magnetic transducers.

At the present time, the use of a two-sided flexible disk system produces serious problems due to the drastic wear on the diskette that results when the two transducers are loaded in an opposed relationship to each other on the opposite sides of the diskette. The wear problems of the two-sided operation includes stripping off the magnetic film from the diskette by the rubbing action produced by the transducer against the diskette. The resulting wear and/on destruction of the diskette is not an important factor in the use of the two-sided systems since the cost of the diskette per se is relatively low. The loss of the data recorded on a diskette, however, presents a serious problem as it is unpredictable as to when the recorded data may be lost. The wear problems associated with the two-sided disk systems have been considered by some floppy disk users an unsolvable and so they have abandoned the use of two-sided systems in favor of single-sided systems. Magnetic transducers packaged in ceramic housings have been promoted as extending the life of the floppy disk systems. It has been found that the wear problems resulting from utilizing the two-sided magnetic transducer systems is produced when the two opposed magnetic transducer are loaded against each other and a "point contact" situation occurs upon the initial contact between the transducers and the recording media. The problem still exists even when the corners of the transducer package are radiused to avoid point contact and similar obvious solutions are incorporated into the system.

The present invention provides an improved flexible diskette recording system that permits two-sided magnetic transducer operation of the diskette with a substantial reduction of wear on the diskette relative to prior art arrangements. A test that is used at the present time for evaluating the wear of magnetic transducer on the diskette is known as a tap-tap test. In the tap-tap test, the magnetic transducer is lowered and raised every other revolution of the diskette at the same point on the diskette. The revolution time for the test is on the order of 166.7 milliseconds. In accordance with the prior art loading arrangements of the transducers in the two-sided magnetic diskette systems, significant or even destructive wear has been noticed in 2 to 5 hours in running a tap-tap test. When the system of the present invention for loading magnetic transducers on both sides of the diskette was subjected to the tap-tap test, it has been found that the diskettes are still usable after the tap-tap test had been run 18–22 hours. This is a substantial improvement in the operating life of such diskettes.

The improved operating results leading to minimizing the flexible diskette wear in accordance with the present invention results from the provision of the improved means for loading and unloading the magnetic transducers with respect to the diskette to insure that point contact does not occur between the magnetic transducers and the diskette upon initial loading and unloading of the magnetic transducers. This improved operation results from flexibly mounting a movable magnetic transducer relative to a fixed magnetic transducer to permit the movable magnetic transducer to assume a parallel relationship with the fixed transducer prior to the operative loading pressure being applied to the movable transducer. This result is achieved through the provision of means constructed and defined with a point contact for applying pressure to the back side of the movable transducer and which point contact is spaced a preselected distance from the transducer when the transducer is not in an operative relationship with the recording media so as to be movable into engagement with and away from the transducer as the loading arm is moved between the operative and nonoperative relationship with the recording media. The thus defined single pressure point provides a preselected pressure contact between the transducer and the recording media only after the mounting arm is positioned in an operative relationship with the diskette. The preselected distance between the point contact means and the transducer is defined to allow the transducer to automatically adjust its contact surface to be parallel with the plane of the loading arm prior to engagement of the thus defined point contact means with the back side of the transducer. This allows the transducer to settle against the media and the opposed transducer without producing the destructive or serious wear of the media.

These and other features of the present invention may be more fully appreciated when considered in the light of the following specification and drawings, in which.

Figure 1:
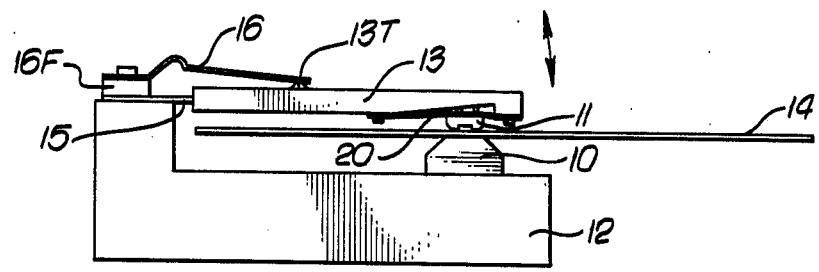
FIG. 1 is a diagrammatic illustration of a two-sided transducer head carriage embodying the present invention and illustrating a pair of transducers loaded against opposite sides of the flexible diskette.

Now referring to the drawings wherein the general organization of a two-sided flexible disk magnetic system is diagrammatically illustrated, the basic structure of the transducer loading system will be examined. The magnetic transducers 10 and 11 for the system are each mounted on transducer carriages 12 and 13, respectively, so as to engage the opposite sides of a diskette 14. The magnetic transducer 10 is mounted in a preselected, fixed position relative to the running plane of the diskette 14 on the carriage 12. The carriage 12 has an L-shaped configuration, as illustrated in the drawings, and swingably mounts a movable carriage 13 carrying the magnetic transducer 11. The carriage 13 is flexibly secured to the carriage 12 by means of a hinge element 15 secured by means of a fastener 16F to the end of the arm of the L-shaped carriage 12. A protrusion 13T is provided intermediate the ends of the movable carriage 13 and coacts with a resilient pressure applying element 16. The pressure applying element 16 is secured by means of the fastener 16F to the carriage 12 and extends outwardly therefrom to overlie the protrusion 13T and exert a preselected amount of pressure on the carriage 13 at the point 13T. The element 16 is sufficiently flexible to allow the carriage 13 to be moved in a clockwise direction away from the diskette 14. When the arm 13 is arranged in its loaded position, the position is maintained by the pressure exerted by the element 16.

The diskette 14 is a thin recording disk that may be constructed of a Mylar base and has a magnetic film or coating disposed thereover. The magnetic coating is deposited on the opposite sides of the diskette 14. The diskette 14 is rotated (by means not shown) in the operation of the system. As in conventional operation of such flexible diskette systems, the diskette 14 may be moved into and out of the system readily.

The movable carriage 13 carries the transducer 11 adjacent the free end thereof. The transducer 11 is mounted to be moved with the carriage 13 so as to be positioned over the transducer 10 and overlie it in a parallel relationship when it is in an operative or loaded position with the diskette 14 arranged between the transducers 10 and 11. As in the normal operation of such flexible disks for proper operation, the two magnetic transducers 10 and 11 gently squeeze the flexible diskette 14 in a manner so that each transducer acts as a transducer/media interface force for the other transducer to insure the optimum media contact. It should also be noted that mechanisms (not shown) can also be included as a portion of the head carriage system so that the two transducers can be readily physically separated from each other for facilitating the removal of the diskette 14 from the magnetic recording system.

Figure 4:
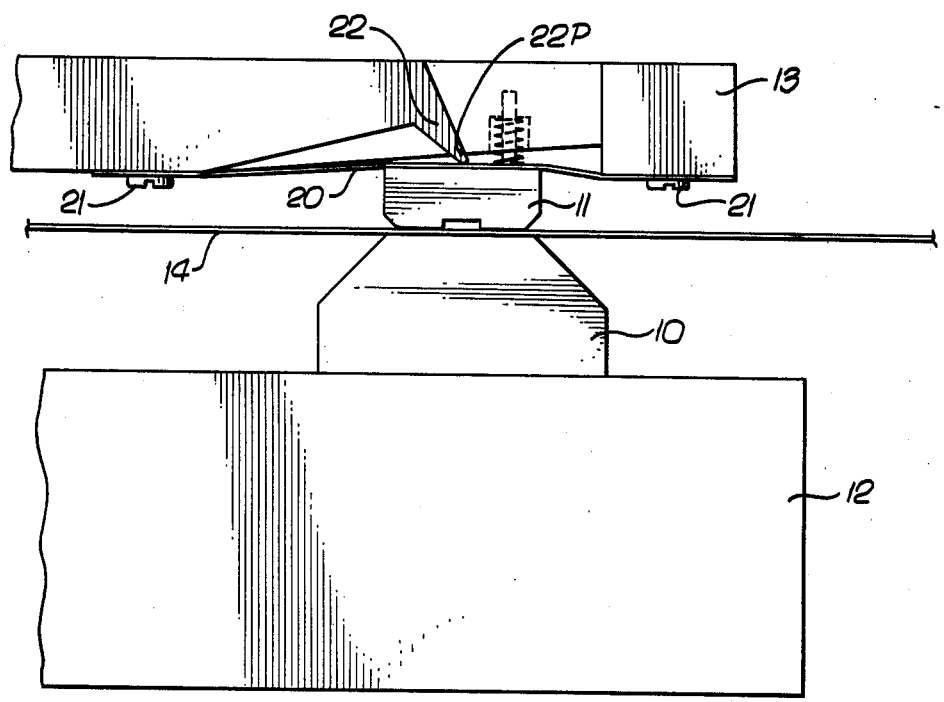
FIG. 4 is a partial, enlarged view of the loaded arrangement of the two-sided magnetic transducing system as illustrated in FIG. 1.
Figure 2:
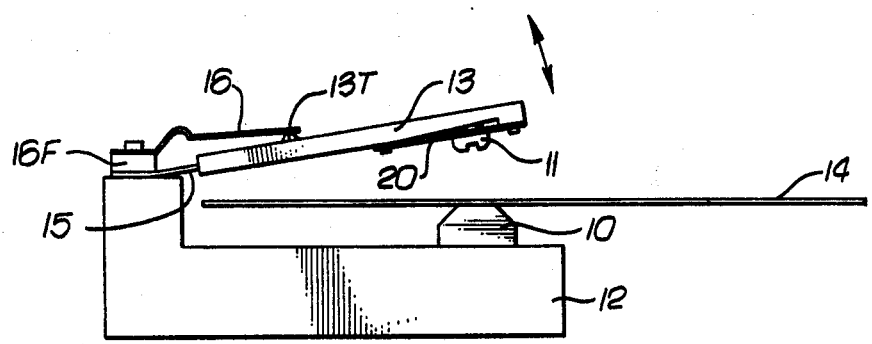
FIG. 2 is a diagrammatic illustration of the two-sided system of FIG. 1 with the movable loading arm unloaded or lifted away from the flexible diskette.
Figure 3:
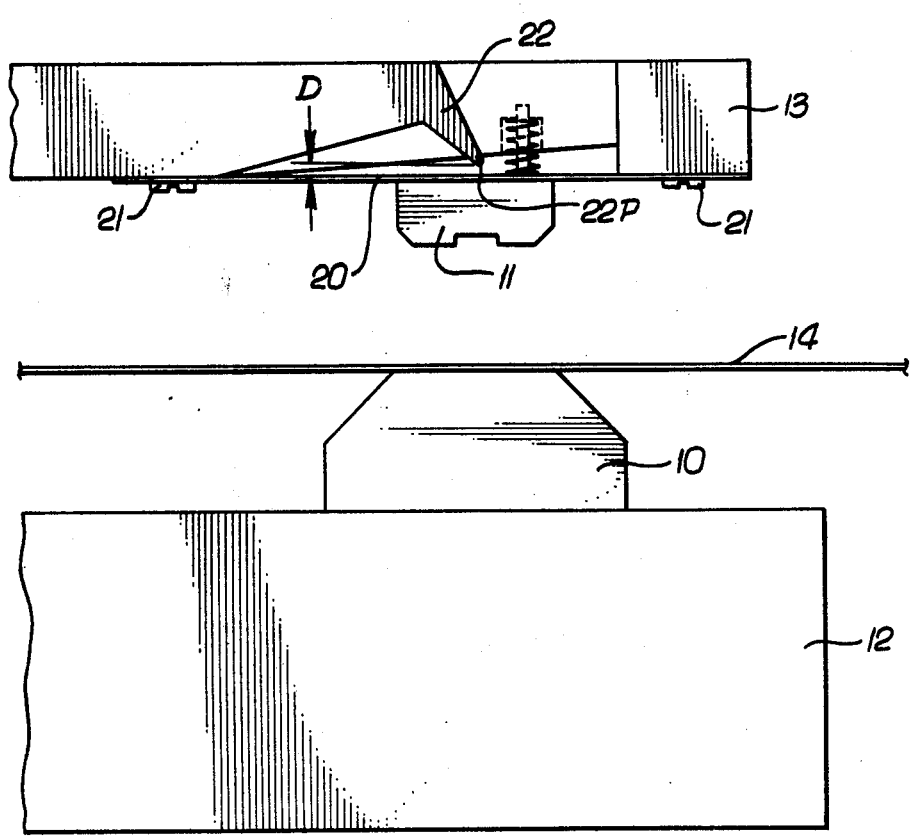
FIG. 3 is a partial, enlarged view of the movable loading arm illustrated in FIG. 2 illustrating the spacing between the point contact means and the magnetic transducer.

Now referring to FIGS. 3 and 4, the specific construction and mounting of the movable transducer 11 will be described. The transducer 11 is mounted to the carriage 13 by means of a flexure 20 that secures the transducer and which flexure, in turn, is secured by means of fasteners 21 to the carriage 13 proper as best illustrated in FIG. 3. In accordance with the present invention, the movable carriage 13 includes means for defining a single pressure point which is illustrated in FIGS. 3 and 4 in the form of a pressure loading arm 22. The loading arm 22 is defined to be arranged behind the back side of the transducer 11 and to have a portion tapered to a point 22P that is spaced a preselected distance D, as identified in FIG. 3, from the back side of the transducer 13. The arm 22 and the single pressure point 22P is defined to move the point 22P into contact with the central point of the back side of the transducer 11 when the carriage 13 is placed in a loaded or operative position with regard to the diskette 14; see FIG. 4. The distance D is selected so that when the carriage 13 is moved toward the fixed transducer 10, the transducer 11 is permitted to settle against the diskette 14 with its operative face arranged in a parallel relationship with the operative face of the fixed transducer 10 before the pressure point 22P engages the back side of the transducer 11. In one practical embodiment, the preselected spacing D has been determined to be 0.03 inches for producing the wear reduction described hereinabove. The provision of such a loading arm 22 eliminates any point contacts between the edges of the transducer 11 and the diskette 14 that causes the excessive wear and/or destruction of the media in prior art systems. Similarly upon unloading the magnetic transducer 11 or the carriage 13 by moving it in a counterclockwise direction away from the diskette 14, the pressure point 22P is initially released from the back side of the transducer 11 so as to cause the transducer 11 to move away from the diskette surface 14 in a parallel fashion without causing any point contact to also eliminate any tendency for wear found in the prior art systems.

It would now be appreciated that the present invention has eliminated the substantial wear and/or destruction of the magnetic media in two-sided flexible disk magnetic recording systems through the advantageous loading of the movable transducer 11 against the fixed transducer 10 by eliminating the diskette. It will also be noted that during the operation of such a pair of loaded transducers that the transducer 11 is allowed to gimbal about the point 22P once it is in engagement with the opposed transducer 10. It should be noted that since a point contact situation does not exist during the initial transducer loading, much lower contact pressure is exerted against the diskette than in prior art systems.

What is claimed is:

1. Apparatus for mounting magnetic transducers on the opposite sides of a flexible diskette recording medium comprising a nonmovable magnetic transducer carriage having a magnetic transducer mounted thereon in a preselected fixed position with respect to the operating plane of a flexible magnetic recording diskette and to be engageable with one side thereof, a movable magnetic transducer carriage having a magnetic transducer mounted thereon in a preselected position so as to be positionable in opposed relationship with the magnetic transducer on the nonmovable carriage so that when the movable carriage makes initial contact with the diskette the magnetic transducers on opposite sides of the diskette gently contact the diskette in a manner so that each of said two transducers respectively serves as a transducer diskette interface force for the other of said two transducers and provide means to insure the positive contact with the diskette, the movable magnetic transducer carriage being mounted on the nonmovable carriage and having means whereby it is swingable into and out of operative relationship with the transducer on the nonmovable carriage, the movable magnetic transducer carriage includes flexible means whose opposed ends are fixedly secured to said movable carriage for mounting the associated magnetic transducer in a plane parallel to the nonmovable carriage, said movable carriage including means for loading its associated magnetic transducer with a preselected amount of pressure after the movable carriage establishes positive contact with the diskette and said transducer on the nonmovable carriage and maintains said preselected pressure between said two transducers when they are in an operative position with the diskette, the movable carriage including a transducer loading arm constructed and defined with a single point for applying pressure to the associated magnetic transducer, the point of the loading arm being adjacent said flexible means and being spaced a preselected distance from the mounting side of said associated magnetic transducer and being movable into engagement with and movable away from the last mentioned transducer when it is in an operative relationship with the magnetic transducer on said nonmovable carriage during the respective loading and unloading of the magnetic transducers, the preselected distance being defined to permit the transducer on the movable carriage to automatically adjust its contact surface to a parallel relationship with the transducer on the nonmovable carriage prior to engagement of the single point of the loading arm with a centrally located point on the flexible means and thus transmit this preselected pressure to the transducer on the movable carriage and thereby allow the two cooperating transducers to automatically adjust their diskette contacting surfaces to be parallel with the plane of the flexible diskette while in the operative position.

2. Apparatus for mounting magnetic transducers on the opposite sides of a flexible diskette recording medium as defined in claim 1 wherein said preselected spacing is on the order of 0.030 inches.

3. Apparatus for mounting magnetic transducers on the opposite sides of a flexible diskette recording medium as defined in claim 1 wherein said movable magnetic transducer gimbals about the single pressure point when the movable carriage is in the operative position with said diskette.

4. A method of loading two magnetic transducers in operative relationship with a flexible diskette recording medium on both sides of the recording medium including the steps of mounting one magnetic transducer on a nonmovable magnetic transducer carriage in a fixed relationship with respect to the recording medium and the other magnetic transducer so as to be engageable with the flexible recording medium on one side thereof, mounting the other magnetic transducer on a movable magnetic transducer carriage in a preselected position so that when the carriage is moved into operating relationship with the flexible recording medium, said other magnetic transducer is positioned to be engageable with the flexible recording medium on the opposite side of the medium from said one magnetic transducer so that the two opposed magnetic transducers can gently squeeze the medium in a manner so that each transducer acts as a transducer/medium interface force for the other transducer to insure the positive medium contact when the medium is therebetween, the mounting of said other magnetic transducer on the movable magnetic transducer carriage including said other steps of mounting the magnetic transducer on a flexible mounting element whose opposed end portions are fixedly secured to the movable magnetic transducer carriage, the transducer carriage including a transducer loading arm having a pressure applying point engageable with said flexible mounting element at a location opposite the central point of the secured side of said other magnetic transducer said pressure applying point is located a preselected distance from the secured side of said other magnetic transducer whereby when the movable transducer carriage is moved it initially achieves a positive contacting relationship between the flexible medium and the two opposed transducers, subsequent movement of said transducer loading arm causes its pressure applying point to move said preselected distance and exert a preselected pressure between the flexible medium and the two opposed transducers, initial positive contacting of the flexible medium automatically adjusts the two opposed transducers into a substantially normal relationship with the contained flexible medium and the subsequent pressure applying loading arm establishes an operative relationship between the transducers and the flexible medium and permits the other transducer to compensate for irregularities in the transducing planes due to medium movement.

5. A method of loading two magnetic transducers in operative relationship with a flexible diskette recording medium on both sides of the recording medium as defined in claim 4 wherein upon engagement of the pressure applying point with the secured side of the magnetic transducer, said other magnetic transducer will be permitted to gimbal about the pressure point.

* * * * *

UNITED STATES PATENT OFFICE
CERTIFICATE OF CORRECTION

Patent No. 4,167,766     Dated September 11, 1979

Inventor(s) Set B. Chau

It is certified that error appears in the above-identified patent and that said Letters Patent are hereby corrected as shown below:

Col. 1, line 45, change "and/on" to -- and/or --.

Col. 1, line 52, change "an" to -- as --.

Col. 1, lines 58-59, change "systems" to -- system --.

Col. 1, line 59-60, change "transducer" to -- transducers --.

Col. 4, line 33, before "diskette" add - tendency for point contacts between the transducer and the --.

Col. 6, line 21, after "carriage" add -- further --.

Signed and Sealed this

Twelfth Day of August 1980

[SEAL]

Attest:

SIDNEY A. DIAMOND

Attesting Officer     Commissioner of Patents and Trademarks